Jan. 24, 1939.   H. GEFFCKEN   2,144,719
WIND OPERATED POWER GENERATOR
Filed Oct. 12, 1937   2 Sheets-Sheet 1
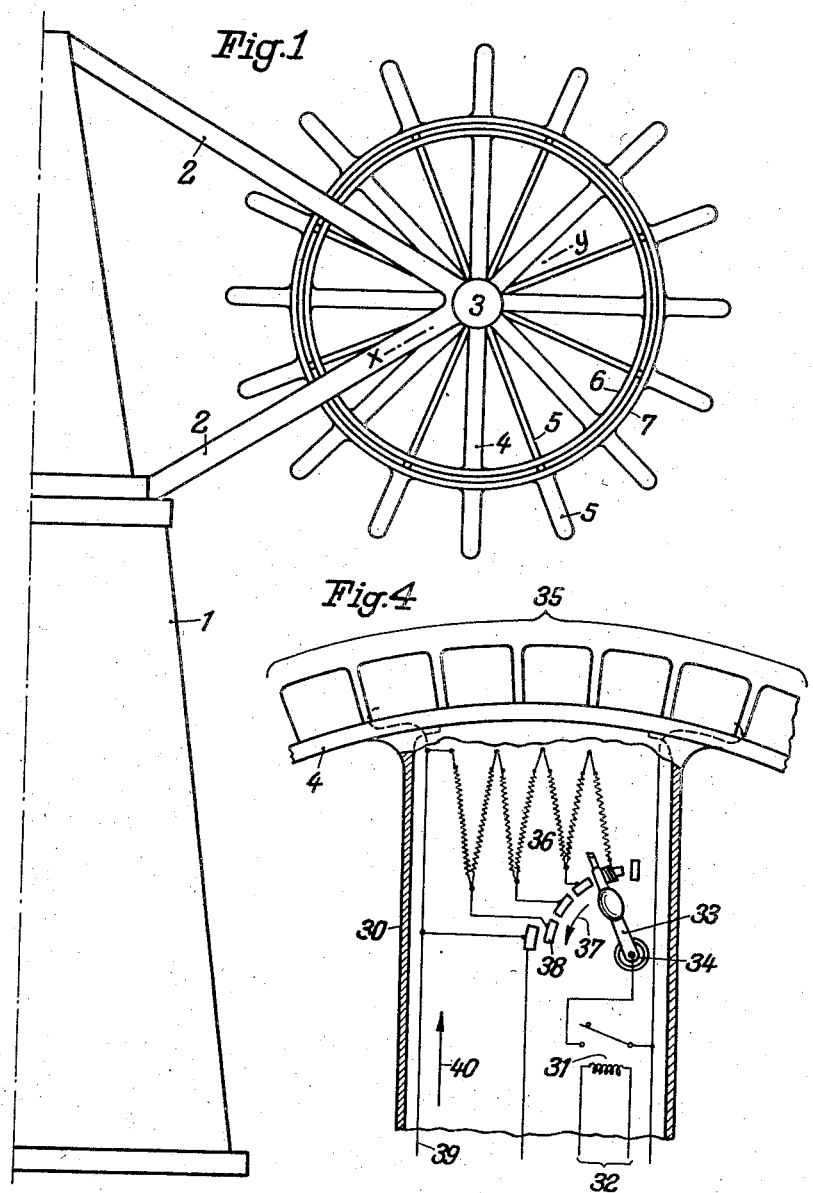
Inventor:
Heinrich Geffcken
By: Richardson and Auer
Att'ys Jan. 24, 1939.  H. GEFFCKEN  2,144,719
WIND OPERATED POWER GENERATOR
Filed Oct. 12, 1937   2 Sheets-Sheet 2
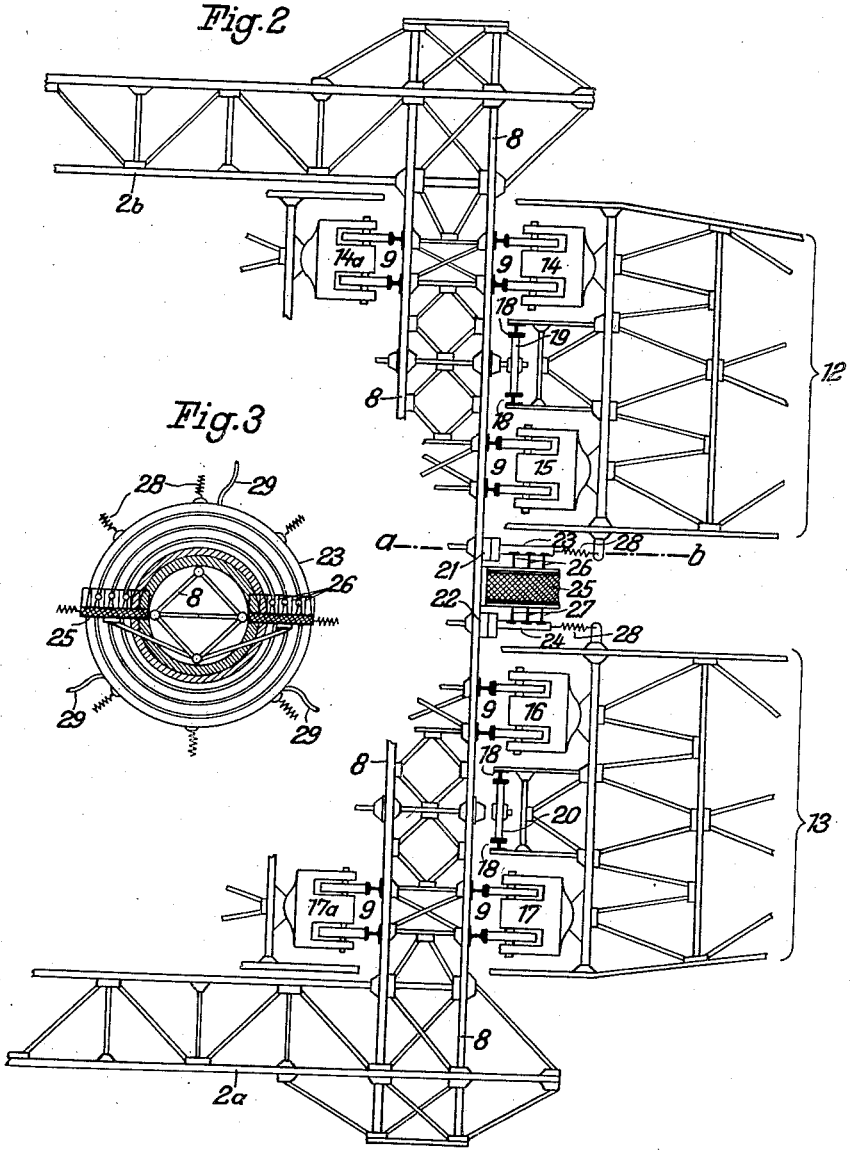
Inventor:
Heinrich Geffcken Patented Jan. 24, 1939

2,144,719

UNITED STATES PATENT OFFICE 2,144,719

WIND OPERATED POWER GENERATOR

Heinrich Geffcken, Berlin-Charlottenburg, Germany

Application October 12, 1937, Serial No. 168,677
In Germany October 12, 1936

8 Claims. (Cl. 290—44)

The present invention relates to wind-operated power generators, and particularly to large capacity generators of this type.

In order to obtain satisfactory results and the desired efficiency with such generators, it is necessary to provide wind-wheels of very large size. Such wind-wheels, having a diameter of 50 to 150 meters, must rotate relatively slowly in order to avoid dangerous peripheral speeds, and an economical production of electrical energy is therefore only possible if the wind-wheels are utilized as carriers for the pole-rings, giving these pole-rings a very large diameter of from 40 to 80 meters.

These facts are well known. The practical construction of electrical power generators wherein the diameter of the rotating parts is about 40 to 80 meters introduces, however, a series of difficulties. It is, of course, possible to provide the proper bearings for such large wind-wheels carrying the pole-rings, but bearings which are suitable necessarily have such enormous proportions that a considerable play must be taken into account. This bearing play causes difficulties incident to the construction and location of the apparatus required for taking off the current, that is, the requisite rotary contact or collector system. The latter must not have any noticeable play where currents of 10,000 to 25,000 kva., for example, are to be conducted substantially without arcing. These difficulties are eliminated by the present invention.

The current transmission from the rotating parts of the generator, which are provided on the wind-wheels, to the stationary parts of the machine takes place, according to the invention, by means of a switching arrangement which is journalled independently of the wind-wheel upon the same shaft and is actuated by the wind-wheel through resilient connecting members. The rotating part of this arrangement is preferably made in the form of a disk and not in the form of a cylinder, that is, as a disk collector or as a disk-shaped rotary contactor, thereby avoiding unnecessary lengthening of the shaft. If the machine comprises two co-axially journalled serially disposed wind-wheels which rotate in opposite directions, the switching arrangement is preferably disposed between these wind-wheels, and one common switching arrangement will then suffice for both pole systems.

Currents of 2000 to 5000 amperes can be transmitted without difficulty, with an arrangement as described above. It is not advisable to go much higher with the load because the resilient or yielding members which connect the wind-wheel with the rotating parts of the switching device would be exposed to danger and destruction. The generator may, however, be exposed temporarily to greater loads, as, for example, when it is required to quickly slow down the wind turbine for repairs. For this purpose, short-circuiting devices are provided on the turbines which rotate with them and which may be remotely controlled to throw an artificial load on the generator, thereby producing a braking effect.

The invention will now be described in detail with reference to the accompanying drawings, wherein Fig. 1 is a diagrammatic side view of part of a wind-operated power generator;

Fig. 2 is a section along the line $x$—$y$ in Fig. 1, with certain parts broken away for the sake of clear and simple representation;

Fig. 3 represents a section along line $a$—$b$ in Fig. 2, showing one of the collectors and corresponding brush system; and Fig. 4 illustrates a section through part of one of the wind-wheels showing the short-circuiting device.

Referring now to the drawings, in Fig. 1 is shown schematically the right half of a wind-power generator of large capacity. On a tower 1, which may be about 300 meters high, are provided the cantilevers 2 and 2a supporting one end of a common shaft 3 for carrying the wind-wheels 4 and 5 which are arranged coaxially on the shaft. Two similar cantilevers support the other end of the shaft. The outer wind-wheel may have a diameter of about 150 meters, and the inner wind-wheel a diameter of about 80 meters. The two wind-wheels are provided with rims 6 and 7, respectively, one carrying the field pole-ring and the other carrying the armature pole-ring of the electrical generator proper. Inasmuch as the diameter of this dynamo-electric generator is about 80 meters, the circumference of the pole-rings is roughly 250 meters. About 500 individual poles are circumferentially distributed upon each of these pole-rings.

Fig. 2 illustrates a section along line $x$—$y$ of Fig. 1, of the machine; i. e., it shows a view through the shaft 3 indicated in Fig. 1. The shaft consists of a carefully constructed reinforced steel tubing 8 which is carried by the members such as 2a and 2b of the cantilever system projecting from the tower. The shaft is stationary. Around the steel tubing 8 are provided four ring-like double rails or tracks 9, which are engaged by the rollers of a number of bearing members which are uniformly distributed around the circumference and support the wind-wheels 12 and 13. Only six of these bearing members are indicated in Fig. 2, namely, 14, 14a, 15, 16, 17, and 17a. Between the two sets of bearing members 9 which belong to each wind-wheel, there is disposed a pair of ring-shaped rails or tracks 18 rigidly secured to the associated wind-wheel. One pair of rails cooperates with rollers, such as 19, and the other with rollers such as 20. These rollers are journalled on radially disposed shafts provided on the steel tubing 8. They receive the thrust due to wind pressure which tends to move the wind-wheels longitudinally along the shaft.

The wind-wheels 12 and 13 are thus carried on rollers which engage rails or tracks extending circumferentially around the steel tubing 8. It will be realized that it is possible in this manner to securely journal even the enormous masses of a wind-wheel having a diameter of about 150 meters. It will also be realized, however, that a certain amount of play between the shaft and the bearing members is unavoidable in such shaft structures.

This play is kept from interfering with the current switching arrangement, in accordance with the invention, by separately journalling the latter on bearings 21 and 22. The arrangement comprises preferably two disks 23 and 24 which carry the contact rings for the field and armature, respectively, and which are disposed on both sides of the bridge 25 between the wind-wheels 12 and 13. This bridge carries the brush sets 26 and 27. The disks 23 and 24 are mechanically connected with the corresponding wind-wheels by means of elastic members 28, so that they rotate with the wind-wheels. The electrical connections are taken care of by means of flexible cables 29 indicated in Fig. 3.

The section Fig. 3 is taken through the shaft 8 and shows the circular contact disk 23 along the line a—b in Fig. 2. A corresponding section of the bridge 25 is indicated in front of the disk section.

In order to protect the switching arrangement, and particularly the yielding cables 29, against undue amperages of a short circuit load, applied for the purpose of stopping the wheels as mentioned hereinbefore, there are provided short-circuiting switches in the rotating wind-wheels 12 and 13, which may be controlled over additional contact rings provided (but not shown) upon the disks 23 and 24. It is advisable to use a series of separate short-circuiting switches, each short-circuiting only part of the pole windings over suitable resistance means.

Fig. 4 shows schematically a section of the wind-wheel 4. Within the hollow wing 30 is provided the short-circuiting switch 31 which may be actuated from the attendant's switchboard over the control conductors 32. The switch 31 is in series with a centrifugal switch having an arm 33 which is biased by a spring 34 in the direction of the arrow 37. With the wind-wheel operating, the arm 33 takes the position shown in the drawings, so that the windings of the diagrammatically indicated poles 35 are shorted through the entire resistance 36 at the moment when the switch 31 is actuated over the control conductors 32. With reduced rotational speed of the generator, arm 33 moves in the direction of the arrow 37 due to the action of spring 34, and disconnects the resistance 36 step by step until contact 38 is reached, when the resistance 36 is completely bridged and control 39 is connected to the other side of the output circuit through arm 33. This may be used to operate a signal at the switchboard.

The above described use of the switching member (33) which regulates the operating part of the short-circuiting resistance 36 in accordance with the voltage delivered by the generator saves a considerable number of control lines (32). Without this switching member (33) about 4-5 switches (31) with as many control lines would be required. This is in accordance with the invention particularly important because it results in a saving in the resilient cables required between the wind-wheel and the rotating part of the current switching device.

The invention may be practiced within the scope and spirit of the following claims wherein I have defined what is believed to be new and desired to have protected by Letters Patent.

What I claim is:

1. In a wind generator, a shaft, a wind-wheel rotatably supported on said shaft, a generative armature supported on said wheel, a contact device comprising collector rings, separate bearings for supporting said device on said shaft independent of said wind-wheel, resilient means by which said wind-wheel rotates said contact device, and flexible conductors connecting the windings of said armature with said collector rings.

2. In a wind generator, a shaft, two wind-wheels supported on said shaft for rotation in opposite directions, a generator comprising an armature mounted on one wind-wheel and a field mounted on the other, two contact devices located between said wind-wheels and supported for rotation on said shaft independent of said wind wheels, each contact device comprising collector rings, resilient means by which said wheels drive said contact devices, respectively, and flexible conductors connecting the armature and field windings with the collector rings in their associated contact devices.

3. In a generator, a fixed shaft, current-generating elements mounted for rotation on said shaft, means for driving said elements, a contact device comprising collector rings mounted for rotation on said shaft independent of said elements, resilient coupling means whereby rotation of said elements causes rotation of said contact device, flexible conductors connecting the windings of said elements with said collector rings, and brushes engaging said collector rings.

4. In a wind generator, a wind-wheel, an armature supported on and rotated by said wheel, remotely controlled means mounted on the wheel for closing a local circuit through said armature to apply an artificial load to slow down the wheel, and means for counteracting the reduction of said load which would otherwise occur due to the decrease in armature voltage as the wheel slows down.

5. In a wind generator, a wind-wheel, an armature supported on and rotated by said wheel, remotely controlled means supported on said wheel for short-circuiting said armature through a resistance to apply an artificial load, and means also mounted on the wheel for varying the amount of the resistance in accordance with the speed of the wheel.

6. In a wind generator, a shaft, two wind wheels supported on said shaft for rotation in opposite directions, a generator comprising an armature mounted on one wind wheel and a field mounted on the other, a plurality of switches mounted on and rotating with the said wind wheel which carries the said armature, circuit connections over which each switch short-circuits a portion of the winding of said armature, and circuits for controlling said switches extending through brushes and slip rings of the said generator to a remote point.

7. A wind generator as set forth in claim 6, characterized by the provision of resistances associated with the switches, respectively, which are included in the circuit connections over which said switches short-circuit the armature, and means associated with each resistance for gradually reducing its effective value as the rotational speed of the armature wind wheel decreases.

8. In a wind generator, two wind wheels rotatable in opposite directions, a generator comprising an armature mounted on one of said wheels and a field mounted on the other, and means for stopping both wheels when the generator is shut down for repair or for other purposes, said means comprising switching mechanism mounted on the armature wheel and rotating with it for closing a local circuit through the armature, thereby placing an artificial load on the generator, and means for controlling said mechanism from a point outside the generator.

HEINRICH GEFFCKEN.